(12) United States Patent
Ko

(10) Patent No.: US 6,502,842 B2
(45) Date of Patent: Jan. 7, 2003

(54) BICYCLE POWER GENERATING ARRANGEMENT

(76) Inventor: Frank Ko, 3R 2th Fl,No. 6, Ta-An West St, Taichung (TW)

(*) Notice: Subject to any disclaimer, the term of this patent is extended or adjusted under 35 U.S.C. 154(b) by 0 days.

(21) Appl. No.: 09/774,738

(22) Filed: Jan. 30, 2001

(65) Prior Publication Data

US 2002/0100627 A1 Aug. 1, 2002

(51) Int. Cl.[7] .................................................. B62M 1/10
(52) U.S. Cl. ..................... 280/215; 180/15; 180/205; 310/67 A
(58) Field of Search ....................... 180/205, 65.3, 180/65.2, 165, 15, 16; 310/66, 67 R, 67 A; 280/214, 215, 212

(56) References Cited

U.S. PATENT DOCUMENTS

| 3,750,006 A | * | 7/1973 | Kuhn | 322/28 |
| 3,921,745 A | * | 11/1975 | McCulloch et al. | 180/33 C |
| 4,069,451 A | * | 1/1978 | Rouse | 322/1 |
| 5,247,430 A | * | 9/1993 | Schwaller | 362/72 |
| 5,874,792 A | * | 2/1999 | Chen et al. | 310/75 C |
| 5,932,943 A | * | 8/1999 | Werner et al. | 310/67 A |
| 6,050,585 A | * | 4/2000 | Rai | 280/288.4 |
| 6,073,736 A | * | 6/2000 | Franklin | 188/322.15 |
| 6,157,149 A | * | 12/2000 | Ohnuma | 318/139 |
| 6,290,014 B1 | * | 9/2001 | MacCready, Jr. | 180/205 |
| 2002/0038730 A1 | * | 4/2002 | Bidwell | 180/15 |

FOREIGN PATENT DOCUMENTS

JP          8-111910      *    4/1996

* cited by examiner

*Primary Examiner*—Avraham Lerner
(74) *Attorney, Agent, or Firm*—Pro-Techtor International Services

(57) ABSTRACT

A power generating device that includes a dynamo, a rack mounted on the frame of a bicycle to hold the dynamo, and a wheel attached to the rack. When the device is engaged, the wheel contacts the ground and rotates to drive the dynamo while the bicycle is in motion, causing the dynamo to generate electricity.

4 Claims, 5 Drawing Sheets

BICYCLE POWER GENERATING ARRANGEMENT

BACKGROUND OF THE INVENTION

The present invention relates to a bicycle power generating arrangement, which comprises a rack mounted on the frame of a bicycle to hold wheel means on the ground, and a dynamo coupled to the wheel means and actuated to generate electricity upon running of the bicycle.

Various structures of dynamos for bicycle have been disclosed. FIG. 1 shows a dynamo installed in the frame of a bicycle and pressed on the tire of the front wheel according to the prior art. When rotating the front wheel of the bicycle, the dynamo is driven to generate electricity. This structure of dynamo is not satisfactory in function because much resisting force is produced against the pedaling effort of the bicycle rider. The resisting force comes from two sources. One source of the resisting force is the spring means, which forces the rotor of the dynamo against the tire of the front wheel of the bicycle. Because the spring means imparts a pressure to the dynamo against the tire of the front wheel in direction perpendicular to the steering direction of the bicycle, much resisting force is produced against rotation of the front wheel.

The other source of the resisting force is the force required to actuate the dynamo. The output capacity of a dynamo for bicycle may be 6V, 3 W. The power of 3 W is not great. However, because the position of the driving power for the dynamo is at the lateral side of the tire of the front wheel of the bicycle, the arm of force is long, and much resistance is produced when rotating the rotor of the dynamo. Another drawback of this structure of dynamo is that the tire of the front wheel of the bicycle wears quickly with use. Because the rotor of the dynamo rubs on the tire of the front wheel of the bicycle during rotation of the front wheel of the bicycle, the tire of the front wheel of the bicycle wears quickly. Furthermore, because the rotor of the dynamo rubs on the tire of the front wheel of the bicycle, the front wheel of the bicycle tends to be forced out of alignment, causing the bicycle to vibrate during running. FIG. 2 illustrates another structure of dynamo according to the prior art. This structure of dynamo is installed in the spokes of the front wheel of the bicycle, and actuated to generate electricity upon running of the bicycle. This structure of dynamo also has drawbacks. Because the dynamo is not detachable, it works upon running of the bicycle. In the daytime, it is not necessary to provide electricity to the lamp of the bicycle, however the dynamo still works. Further, because the revolving speed of the dynamo is equal to the revolving speed of the wheels of the bicycle, the intensity of magnetic field or the length of the enamel wire of the dynamo must be relatively increased so that sufficient output voltage can be obtained (e=Blv, B=intensity of magnetic field, l=length of enamel wire, v=velocity). However, increasing the intensity of magnetic field or the length of the enamel wire of the dynamo relatively increases the manufacturing cost of the dynamo and its dimension.

SUMMARY OF THE INVENTION

The present invention has been accomplished to provide a bicycle power generating arrangement, which eliminates the aforesaid drawbacks. According to one aspect of the present invention, the bicycle power generating arrangement comprises a dynamo, and wheel means dragged from the frame of the bicycle and rotated over the ground to actuate the dynamo upon running of the bicycle. According to another aspect of the present invention, lock means is provided and adapted to lock the wheel means in a lifted position, preventing the wheel means from rotation during running of the bicycle.

BRIEF DESCRIPTION OF THE DRAWINGS

FIG. 5A is an enlarged view of a part of FIG. 5.

DETAILED DESCRIPTION OF THE PREFERRED EMBODIMENT

Figure 2:
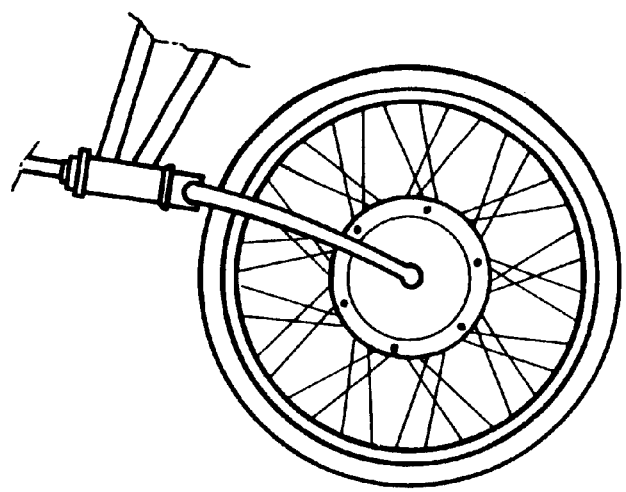
FIG. 2 illustrates another structure of dynamo installed in the spokes of the front wheel of a bicycle according to the prior art.
Figure 1:
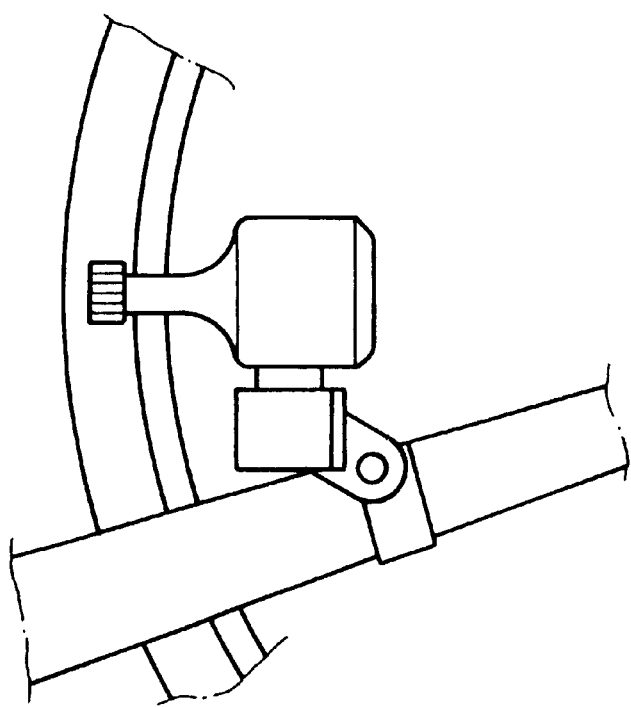
FIG. 1 illustrates a dynamo installed in the frame of a bicycle and pressed on the tire of the front wheel according to the prior art.
Figure 3:
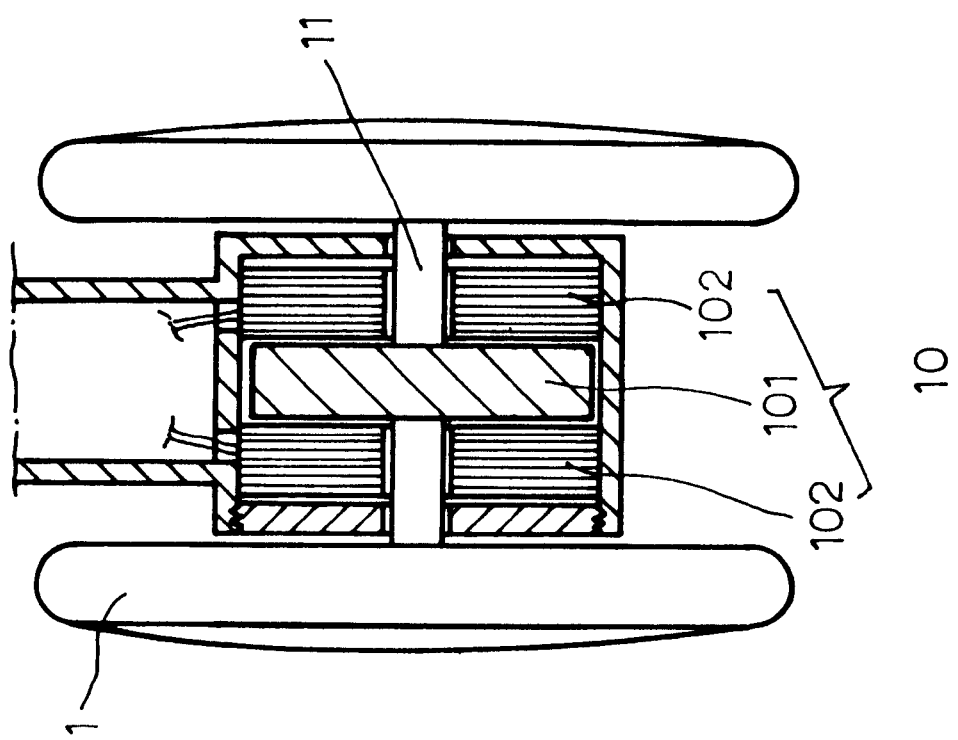
FIG. 3 is a sectional view showing a dynamo coupled between two wheels according to the present invention.
Figure 4:
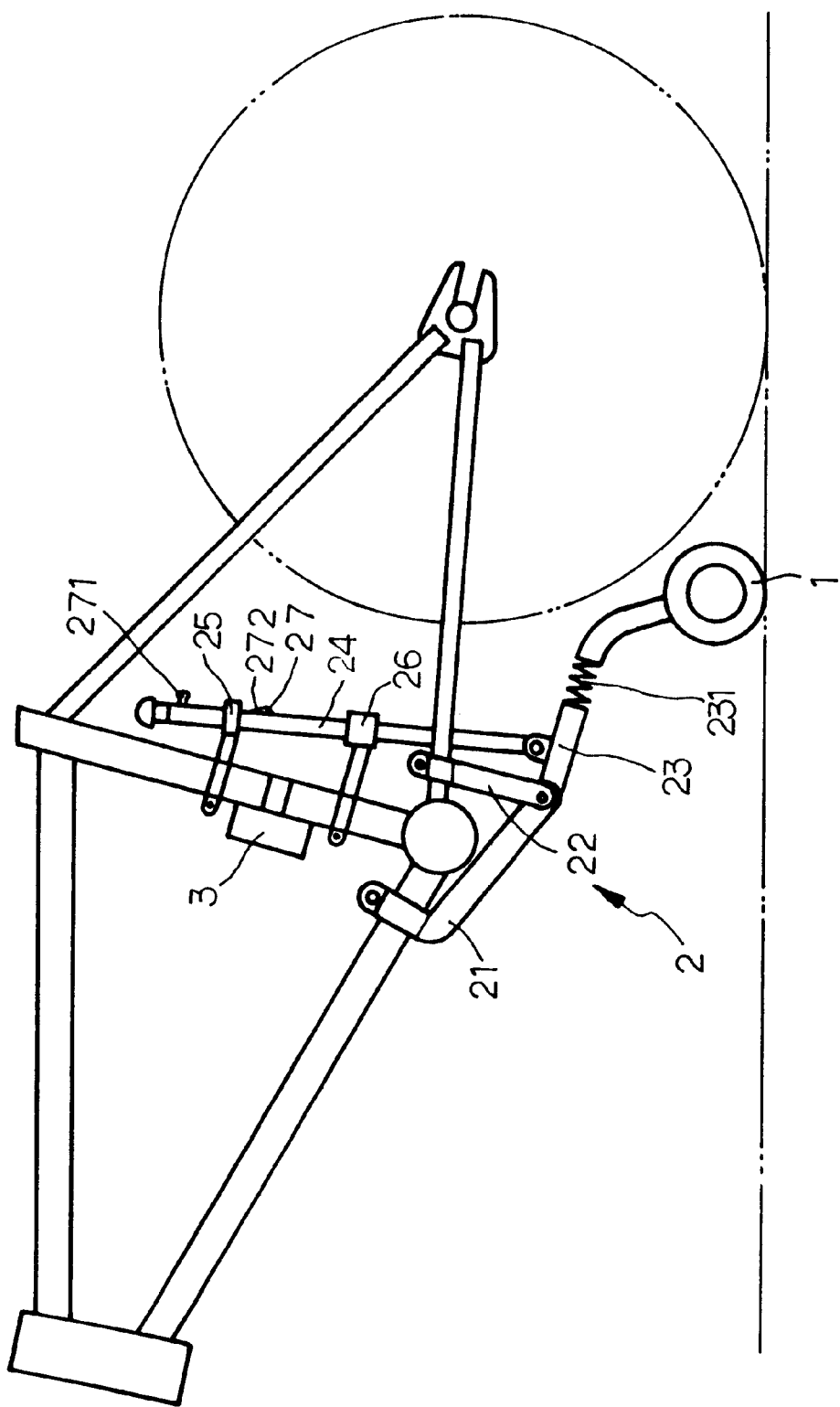
FIG. 4 is a side view of the present invention.

Referring to FIGS. 3 and 4, a dynamo 10 is mounted on a rack 2 on the frame of a bicycle, and actuated by wheels 1 to convert mechanical energy into electric energy. When riding the bicycle, the wheels 1 move over the ground and rotate, causing the dynamo 10 to convert mechanical energy into electric energy.

Referring to FIG. 3 again, the dynamo 10 comprises an axle 11 fixedly connected between the wheels 1, a magnet 101 mounted on and rotated with the axle 11, two windings 102 fixedly disposed at two opposite sides of the magnet 101. When rotating the wheels 1, the magnet 101 is rotated with the axle 11 relative to the windings 102, thereby causing electricity to be produced.

Figure 5:
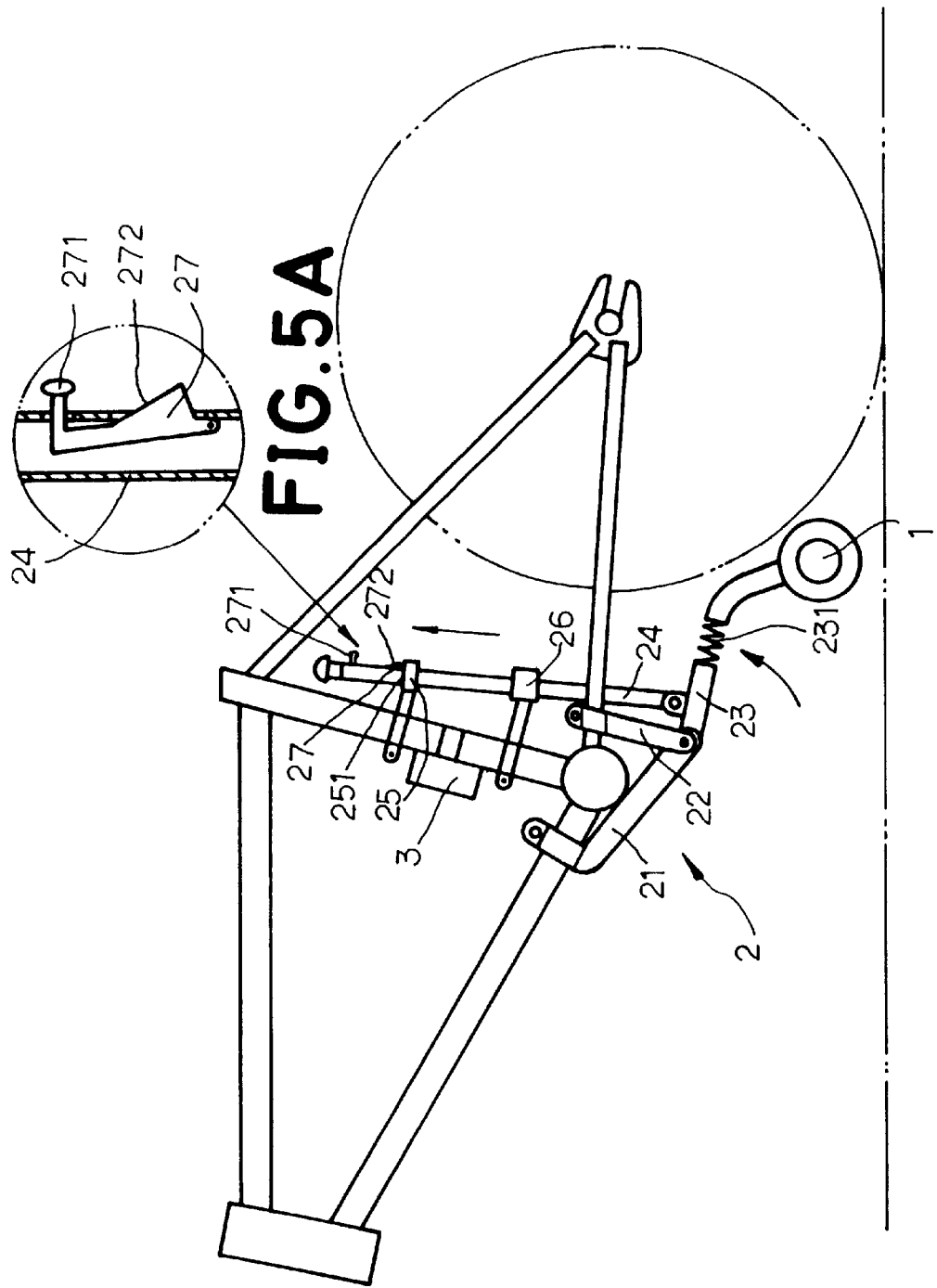
FIG. 5 is similar to FIG. 4 but showing the control rod lifted, the wheels suspended in the open air above the ground.

Referring to FIGS. 4, 5 and 5A, the rack 2 comprises a front mounting frame 21 fixedly fastened to the down tube of the bicycle, a rear mounting frame 22 connected between a rear part of the front mounting frame 21 and the chain stays of the bicycle, a movable frame 23 having one end pivoted to the rear mounting frame 22 and an opposite end connected to the shell of the dynamo 10, an upper barrel 25 and a lower barrel 26 fixedly fastened to the seat tube of the bicycle at different elevations and arranged in a line, a tubular control rod 24 inserted through the upper barrel 25 and the lower barrel 26 and pivoted to the movable frame 23, and a spring hook 27 mounted in the control rod 24 near the top end of the control rod 24. The spring hook 27 comprises a handle portion 271 and a bevel guide face 272. When not in use, the control rod 24 is pulled upwards to lift the movable frame 23. When lifting the control rod 24, the bevel guide face 272 of the spring hook 27 is moved with the control rod 24 over the inside wall of the upper barrel 25 without hindering upward movement of the control rod 24. When passed over the upper barrel 25, the spring hook 27 immediately returns to its former position and stopped above the top side 251 of the upper barrel 25 to prohibit the control rod 24 from downward movement. At this time, the movable frame 23 is turned to the upper position, and the wheels 1 are lifted from the ground and suspended in the open air (see FIG. 5). When in use, the handle portion 271 is operated with the hand to force the spring hook 27 back to the inside of the control rod 24 and to disengage the spring hook 27 from the upper barrel 25, enabling the control rod 24 to be lowered in the barrels 25 and 26, and at the same time the movable frame 23 is turned downwards to lower the dynamo 10 and to force the wheels 1 into contact with the ground (see FIG. 4). When propelling the bicycle, the wheels 1 are continuously rotated, thereby causing the dynamo 10 to generate electricity.

Referring to FIGS. 4 and 5 again, a shock-absorbing spring 231 is connected between the movable frame 23 and the shell of the dynamo 10. The shock-absorbing spring 231 absorbs shocks when the wheels 1 move on the ground, preventing the wheels 1 from damage.

Figure 6:
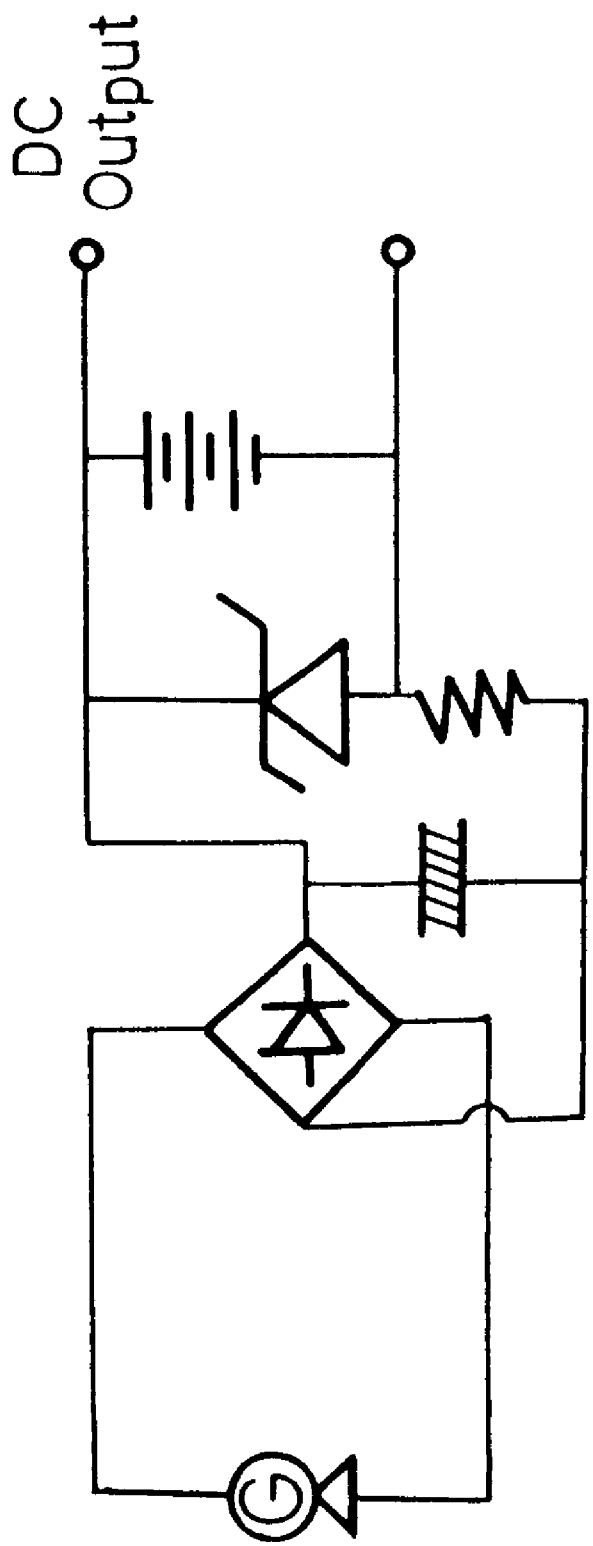
FIG. 6 is a circuit diagram of a voltage stabilizing circuit according to the present invention.

Referring to FIG. 6 and FIGS. 3 and 4 again, a rechargeable battery box 3 is installed in the bicycle frame to receive electricity generated from the dynamo 10. The rechargeable battery box 3 comprises a voltage stabilizing circuit formed of a bridge rectifier and a zener diode. The voltage stabilizing circuit of the rechargeable battery box 3 stabilizes electricity generated by the dynamo 10, and then provides stabilized electricity to the lamp or other electric apparatus attached to the bicycle, or directly charges stabilized electricity to the rechargeable battery in the rechargeable battery box 3.

While only one embodiment of the present invention has been shown and described, it will be understood that various modifications and changes could be made thereunto without departing from the spirit and scope of the invention disclosed.

What the invention claimed is:

1. A power generating device in combination with a bicycle comprising:
   a dynamo,
   a rack mounted on a frame of said bicycle, said dynamo being mounted on said rack, and
   wheel means independent of wheels of said bicycle, said wheel means being mounted on said rack such that said wheel means rotate when said device is actuated and said bicycle is in motion due to contact with a surface upon which said bicycle is moving, mechanical energy of said wheel means being converted into electrical energy by said dynamo; wherein
   said rack comprises:
      a front mounting frame affixed to said frame of said bicycle,
      a rear mounting frame connected between a rear part of said front mounting frame and chain stays of said bicycle,
      a movable frame, said movable frame having a first end pivoted to said rear mounting frame and a second end coupled to said dynamo and said wheel means, an upper barrel and a lower barrel affixed to said frame of said bicycle, a tubular control rod inserted through said upper barrel and said lower barrel and pivoted to said movable frame; wherein
         said control rod is moved between a first position in which said movable frame is lifted so that said wheel means are not in contact with the ground, and a second position in which said movable frame is moved downward to cause said wheel means to be in contact with the ground so that said wheel means are rotated to operate said dynamo when said bicycle is in motion.

2. The power generating device in combination with a bicycle of claim 1, wherein:
   a rechargeable battery and a voltage stabilizing circuit are installed in a rechargeable battery box affixed to said frame of said bicycle,
   said voltage stabilizing circuit comprising a bridge rectifier and a zener diode so that said voltage stabilizing circuit stabilizes electricity generated by said dynamo and charges said rechargeable battery installed in said rechargeable battery box.

3. A power generating device in combination with a bicycle comprising:
   a dynamo,
   a rack mounted on a frame of said bicycle, said dynamo being mounted on said rack, and
   wheel means independent of wheels of said bicycle, said wheel means being mounted on said rack such that said wheel means rotate when said device is actuated and said bicycle is in motion due to contact with a surface upon which said bicycle is moving, mechanical energy of said wheel means being converted into electrical energy by said dynamo; and wherein
   said rack comprises:
      a front mounting frame affixed to said frame of said bicycle,
      a rear mounting frame connected between a rear part of said front mounting frame and chain stays of said bicycle,
      a movable frame, said movable frame having a first end pivoted to said rear mounting frame and a second end coupled to said dynamo and said wheel means, an upper barrel and a lower barrel affixed to said frame of said bicycle, a tubular control rod inserted through said upper barrel and said lower barrel and pivoted to said movable frame; wherein
         said control rod is moved between a first position in which said movable frame is lifted so that said wheel means are not in contact with the ground, and a second position in which said movable frame is moved downward to cause said wheel means to be in contact with the ground so that said wheel means are rotated to operate said dynamo when said bicycle is in motion, and
         shock-absorbing spring means are coupled between said movable frame and said wheel means.

4. The power generating device in combination with a bicycle of claim 3, wherein:
   a rechargeable battery and a voltage stabilizing circuit are installed in a rechargeable battery box affixed to said frame of said bicycle,
   said voltage stabilizing circuit comprising a bridge rectifier and a zener diode so that said voltage stabilizing circuit stabilizes electricity generated by said dynamo and charges said rechargeable battery installed in said rechargeable battery box.

* * * * *